US012810867B2

(12) United States Patent
Zhao et al.

(10) Patent No.: US 12,810,867 B2
(45) **Date of Patent: *Nov. 24, 2026**

(54) INFORMATION PROCESSING METHOD, SYSTEM, APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Li Zhao, Beijing (CN); Xiao Han, Beijing (CN); Kojung Chen, Beijing (CN); Jian Tong, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 174 days.

This patent is subject to a terminal disclaimer.

(21) Appl. No.: 18/789,194

(22) Filed: Jul. 30, 2024

(65) Prior Publication Data

US 2024/0395255 A1 Nov. 28, 2024

Related U.S. Application Data

(63) Continuation of application No. 18/499,001, filed on Oct. 31, 2023, now Pat. No. 12,051,420, which is a (Continued)

(30) Foreign Application Priority Data

Jun. 9, 2020 (CN) ........................ 202010518278.3

(51) Int. Cl.
*G10L 15/00* (2013.01)
*G06F 40/58* (2020.01)

(Continued)

(52) U.S. Cl.
CPC .............. *G10L 15/26* (2013.01); *G06F 40/58* (2020.01); *G10L 15/22* (2013.01); *G10L 15/30* (2013.01)

(58) Field of Classification Search
CPC ....... G06F 40/166; G06F 40/169; G10L 15/26
See application file for complete search history.

(56) References Cited

U.S. PATENT DOCUMENTS 6,473,778 B1 * 10/2002 Gibbon ................ G06F 40/103
715/201
9,066,049 B2 6/2015 Scoggins et al.

(Continued)

FOREIGN PATENT DOCUMENTS

CN 1770262 A 5/2006
CN 1976344 A 6/2007

(Continued)

OTHER PUBLICATIONS

Summons to attend oral proceedings for EP Patent Application No. 21821814.7, Issued on Sep. 4, 2024, 12 pages.

(Continued)

*Primary Examiner* — Daniel Abebe

(57) ABSTRACT

An information processing method, a system, an apparatus, an electronic device and a storage medium, where the method is applied to a client, and includes: receiving a transcript and a sentence identifier of the transcript sent by a service server; reading a local sentence identifier, and when the received sentence identifier is the same as the local sentence identifier, updating a displayed caption content corresponding to the local sentence identifier with the transcript. When the received sentence identifier of the client is the same as the local sentence identifier, the displayed caption content is replaced with the received transcript.

20 Claims, 4 Drawing Sheets

Related U.S. Application Data continuation of application No. 17/699,551, filed on Mar. 21, 2022, now Pat. No. 11,900,945, which is a continuation of application No. PCT/CN2021/098533, filed on Jun. 7, 2021.

(51) Int. Cl.

| | |
|---|---|
| ***G10L 15/22*** | (2006.01) |
| ***G10L 15/26*** | (2006.01) |
| ***G10L 15/30*** | (2013.01) |

(56) References Cited

U.S. PATENT DOCUMENTS

| | | | | |
|---|---|---|---|---|
| 9,886,423 | B2 | 2/2018 | Dow et al. | |
| 10,204,641 | B2 | 2/2019 | Ryan et al. | |
| 10,332,506 | B2 | 6/2019 | Pappu et al. | |
| 10,657,834 | B2 | 5/2020 | Samuelson et al. | |
| 10,762,060 | B1 | 9/2020 | Faulkner et al. | |
| 10,917,607 | B1 | 2/2021 | Cheung et al. | |
| 11,100,164 | B2 | 8/2021 | Soni et al. | |
| 11,347,379 | B1 | 5/2022 | Levit et al. | |
| 11,373,654 | B2 | 6/2022 | Roeck | |
| 2006/0190809 | A1 | 8/2006 | Hejna, Jr. | |
| 2007/0118373 | A1* | 5/2007 | Wise | G10L 21/06 704/235 |
| 2011/0123003 | A1* | 5/2011 | Romriell | G06F 40/166 715/256 |
| 2011/0161080 | A1 | 6/2011 | Ballinger et al. | |
| 2012/0197770 | A1 | 8/2012 | Raheja et al. | |
| 2013/0060572 | A1 | 3/2013 | Garland et al. | |
| 2013/0158995 | A1 | 6/2013 | Romriell et al. | |
| 2014/0198252 | A1 | 7/2014 | Pornprasitsakul et al. | |
| 2015/0051908 | A1 | 2/2015 | Romriell et al. | |
| 2015/0113013 | A1 | 4/2015 | Rys et al. | |
| 2016/0012821 | A1 | 1/2016 | Goldberg | |
| 2016/0026962 | A1 | 1/2016 | Shankar et al. | |
| 2017/0040037 | A1 | 2/2017 | Hunt et al. | |
| 2017/0062010 | A1 | 3/2017 | Pappu et al. | |
| 2017/0085696 | A1 | 3/2017 | Abkairov | |
| 2018/0052831 | A1 | 2/2018 | Ahn et al. | |
| 2019/0250803 | A1 | 8/2019 | Norder et al. | |
| 2019/0377826 | A1 | 12/2019 | Soni et al. | |
| 2020/0051582 | A1 | 2/2020 | Gilson | |
| 2020/0160867 | A1 | 5/2020 | Roeck | |
| 2020/0380989 | A1 | 12/2020 | Antunes et al. | |
| 2021/0118432 | A1 | 4/2021 | Mccourt et al. | |
| 2021/0158807 | A1 | 5/2021 | Aher et al. | |
| 2021/0224319 | A1 | 7/2021 | Ingel et al. | |
| 2021/0320953 | A1 | 10/2021 | Sexauer | |
| 2021/0343290 | A1 | 11/2021 | Agarwal et al. | |
| 2021/0343291 | A1 | 11/2021 | Agarwal et al. | |
| 2024/0062762 | A1 | 2/2024 | Zhao et al. | |

FOREIGN PATENT DOCUMENTS

| | | | | |
|---|---|---|---|---|
| CN | 101374307 | A | 2/2009 | |
| CN | 103888597 | A | 6/2014 | |
| CN | 104050160 | A | 9/2014 | |
| CN | 105513586 | A | 4/2016 | |
| CN | 105827499 | A | 8/2016 | |
| CN | 105931641 | A | 9/2016 | |
| CN | 106340291 | A | 1/2017 | |
| CN | 106412678 | A | 2/2017 | |
| CN | 108259971 | A | 7/2018 | |
| CN | 108538284 | A | 9/2018 | |
| CN | 109936665 | A | 6/2019 | |
| CN | 110379406 | A | 10/2019 | |
| CN | 110415706 | A | 11/2019 | |
| CN | 111711853 | A | 9/2020 | |
| CN | 112511910 | A | 3/2021 | |
| JP | 2010-074482 | A | 4/2010 | |
| JP | 2016-509408 | A | 3/2016 | |
| JP | 2020-027984 | A | 2/2020 | |
| SG | 10201901335 | | 9/2020 | |
| WO | 2007/119893 | A1 | 10/2007 | |
| WO | WO-2014113071 | A1 * | 7/2014 | G06F 40/58 |
| WO | 2014/191054 | A1 | 12/2014 | |
| WO | 2020/250016 | A1 | 12/2020 | |

OTHER PUBLICATIONS

Chinese Patent Application No. 202010518278.3 First Office Action, with English language translation (14 pages).

Chinese Patent Application No. 202010518278.3 Notice of Allowance (1 page).

Extended EP Search Report mailed Sep. 15, 2023 in EP Appl. No. 21821814.7 (10 pages).

First Office Action issued Jan. 19, 2023 in Chinese Application No. 202111491495.9 (9 pages).

International Patent Application No. PCT/CN2021/098533 International Search Report mailed Aug. 18, 2021, with English language translation (12 pages).

Notice of Allowance mailed Apr. 15, 2023 in CN Appl. No. 202111491495.9, English translation (12 pages).

Notice of Allowance mailed Jul. 31, 2023 in U.S. Appl. No. 17/699,551 (14 pages).

Notice of Allowance mailed Mar. 27, 2024 in U.S. Appl. No. 18/499,001 (7 pages).

Notice of Reasons for Refusal issued Oct. 31, 2023 in Japanese Application No. 2022-549101, with English translation (6 pages).

Office Action issued Dec. 12, 2023 in U.S. Appl. No. 18/499,001.

Office Action mailed Apr. 13, 2023 in U.S. Appl. No. 17/699,551 (18 pages).

Office Action mailed Jul. 21, 2022 in U.S. Appl. No. 17/699,551 (17 pages).

Updated Notice of Allowance mailed Sep. 26, 2022 in U.S. Appl. No. 17/699,551 (13 pages).

Deshpande R., et al., "A Crowdsourcing Caption Editor for Educational Videos," Proceedings of the 2014 IEEE Frontiers in Education Conference (FIE), Madrid, Spain, 2014, pp. 1-8, DOI: 10.1109/FIE.2014.7044040.

* cited by examiner

INFORMATION PROCESSING METHOD, SYSTEM, APPARATUS, ELECTRONIC DEVICE AND STORAGE MEDIUM

CROSS-REFERENCE TO RELATED APPLICATIONS

This application is continuation of U.S. patent application Ser. No. 18/499,001 filed on Oct. 31, 2023, which is a continuation of U.S. patent application Ser. No. 17/699,551, filed on Mar. 21, 2022, which is a continuation of International Application No. PCT/CN2021/098533, filed on Jun. 7, 2021. The International Application claims priority to Chinese Patent Application No. 202010518278.3, filed on Jun. 9, 2020. The disclosures of the aforementioned applications are hereby incorporated by reference in their entireties.

TECHNICAL FIELD

Embodiments of the present disclosure relates to a technical field of computer technology, in particular to an information processing method, a system, an apparatus, an electronic device and a storage medium.

BACKGROUND

With continuous development of the Internet and communication technologies, information communication through communication applications has become one of important ways for a user to exchange information. When clients perform communication containing audio data with each other, a server may transcribe the audio data into texts and issue the texts to a corresponding client, so that the client displays captions corresponding to the audio data.

At present, the server normally issues the transcribed texts to the client after finishing transcribing audio data of each sentence, so that the client may see captions corresponding to each sentence with latency delays. Moreover, when a sentence is long, latency delay of captions will be longer, which will greatly degrade interactive experience of users.

SUMMARY

The embodiments of the present disclosure provide an information processing method, an apparatus, an electronic device and a storage medium, which can realize dynamic caption display, reduce caption latency and improve user experience.

In a first aspect, the embodiments of the present disclosure provide an information processing method, including:

receiving a first transcript corresponding to first audio data;

displaying the first transcript;

receiving a second transcript corresponding to second audio data, where the first audio data and the second audio data correspond to a same sentence or different sentences, and the first audio data is a subset of the second audio data when the first audio data and the second audio data correspond to the same sentence; and displaying the second transcript to update the first transcript;

where the displaying the second transcript to update the first transcript includes:

displaying the second transcript to replace the first transcript; or, displaying a transcript updated based on a difference between the first transcript and the second transcript.

In a second aspect, the embodiments of the present disclosure further provide an electronic device, and the electronic device includes:

one or more processors; and a storing apparatus, configured to store one or more programs, when the one or more programs are executed by the one or more processors, the electronic device is enabled to implement the information processing method according to any one of the embodiments of the present disclosure.

In a third aspect, the embodiments of the present disclosure further provide a storage medium containing a computer executable instruction, and the computer executable instruction is used to execute the information processing method according to any one of the embodiments of the present disclosure when executed by a computer processor.

In a fourth aspect, the embodiments of the present disclosure further provide a computer program product, including a computer program loaded on a computer readable medium, and when executed by a processor, the computer program enables the processor to execute the information processing method according to any one of the embodiments of the present disclosure.

In an fifth aspect, the embodiments of the present disclosure further provide a computer program, which, when run on an electronic device, enables the electronic device to execute the information processing method according to any one of the embodiments of the present disclosure.

In a technical solution of the embodiments of the present disclosure, a client receives a transcript and a sentence identifier of the transcript sent by a service server; reads a local sentence identifier, and when the received sentence identifier is the same as the local sentence identifier, updates a displayed caption content corresponding to the local sentence identifier with the transcript. When the received sentence identifier of the client is the same as the local sentence identifier, the displayed caption content may be replaced with the received transcript, which can realize displaying a caption when a first intermediate transcription result of a sentence is received and dynamically updating a caption content corresponding to the sentence when a subsequent intermediate transcription result of the sentence is received in a process of transcribing the audio data of a same sentence into text, which not only realizes dynamically displaying captions of each sentence, but also reduces latency delay of displaying the captions of each sentence, and improves user experience.

BRIEF DESCRIPTION OF DRAWINGS

Combined with drawings and with reference to following detailed implementations, the above and other features, advantages and aspects of various embodiments of the present disclosure will become more apparent. Throughout the drawings, same or similar reference numbers refer to same or similar elements. It should be understood that the drawings are schematic, and the original and elements are not necessarily drawn to scale.

DESCRIPTION OF EMBODIMENTS

Figure 1:
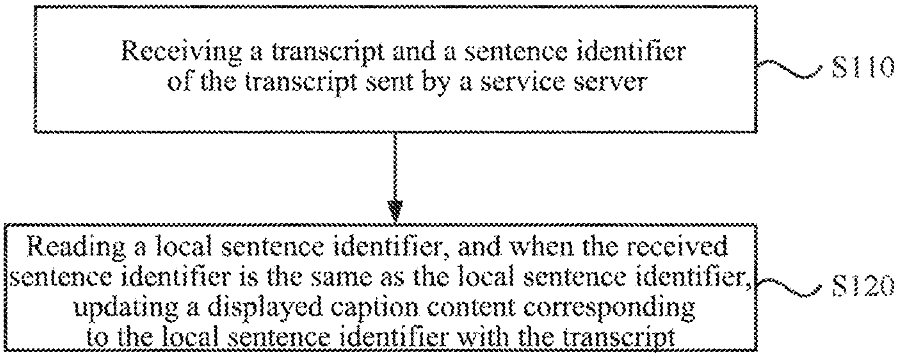
FIG. 1 is a flow diagram of an information processing method provided in a first embodiment of the present disclosure.

The embodiments of the present disclosure will be described in more detail below with reference to the drawings. Although some embodiments of the present disclosure are shown in the drawings, it should be understood that the present disclosure may be realized in various forms and should not be construed as being limited to the embodiments set forth herein, on the contrary, these embodiments are provided for a more thorough and complete understanding of the present disclosure. It should be understood that the drawings and the embodiments of the present disclosure are for exemplary purposes only, and are not intended to limit scope of protection of the present disclosure.

It should be understood that various steps recited in the method embodiments of the present disclosure may be performed in different order and/or in parallel. In addition, the method embodiments may include additional steps and/or omit performing illustrated steps. The scope of the present disclosure is not limited in this respect.

Terms "including" and its variants used herein are open-ended including, that is, "including but not limited to". Terms "based on" means "at least partially based on". Terms "an embodiment" means "at least one embodiment"; terms "another embodiment" means "at least one another embodiment"; terms "some embodiments" means "at least some embodiments". Relevant definitions of other terms will be given in following description.

It should be noted that concepts of "first" and "second" mentioned in the present disclosure are only used to distinguish different apparatuses, modules or units, and are not used to limit order or interdependence of functions performed by these apparatuses, modules or units.

It should be noted that modifications of "one" and "more" mentioned in the present disclosure are illustrative rather than restrictive, and persons skilled in the art should understand that unless being clearly indicated in the context, otherwise, it should be understood as "one or more".

First Embodiment

FIG. 1 is a flow diagram of an information processing method provided in a first embodiment of the present disclosure, and the embodiments of the present disclosure are especially suitable for a situation that a client displays captions in a real-time interactive scene. The method may be implemented by an information processing apparatus; the apparatus may be implemented in a form of software and/or hardware; and the apparatus may be configured in an electronic device, for example, a smart phone, a tablet computer, a laptop, or a desktop computer.

As shown in FIG. 1, the information processing method provided in the present embodiment, applied to a client, includes:

S110, receiving a transcript and a sentence identifier of the transcript sent by a service server.

In the embodiments of the present disclosure, the service server may be regarded as a server that provides caption display service functions for each client. A client that has a real-time interactive communication with other clients may send a caption enabling request to the service server in an interactive communication process, so as to request the service server to feedback transcripts and sentence identifiers of the transcripts obtained by transcribing audio data uploaded by the client and other clients having interactive communications with the client. Furthermore, the client may display captions according to the received transcript and sentence identifiers of the transcript.

In the present embodiment, the service server may pull audio data from a streaming media server according to the caption enabling request sent by the client, and send the audio data to a real-time speech transcribing tool; the real-time speech transcribing tool is based on automatic speech recognition (ASR) technology, which can segment audio data according to parameters of the audio data (for example, time intervals between the audio data and other parameters) to determine audio data corresponding to each sentence, and can also take audio data corresponding to a current to-be-transcribed sentence as current to-be-transcribed audio data, and perform a text transcribing operation on the current to-be-transcribed audio data which can output an intermediate transcription result; the service server obtains a transcript transcribed from the current to-be-transcribed audio data from the real-time speech transcribing tool, and the obtained transcript includes a transcript of the current to-be-transcribed audio data in a transcribing process and a transcript of complete transcription.

The caption enabling requests sent by each client may carry an identity identifier representing the client or an identifier representing a real-time interactive room such as a conference room and a live room where the client is located, and the service server may pull audio data uploaded by the client and other clients interacting with the client from the streaming media server according to the above identifier. The real-time speech transcribing tool may be provided locally by the service server or by a third-party establishing communication with the service server, and through the real-time speech transcribing tool, automatic speech recognition process may be performed on audio data stream, and sentence segmentation of the audio data stream and text transcribing operation for audio data corresponding to each sentence may be realized. The intermediate transcription result may be considered as a transcript corresponding to part of audio data, which is obtained from transcription before obtaining a transcript from transcription and corresponding to complete audio data. For example, for audio data of a sentence "today's weather is really good", its intermediate transcription result may be a series of transcripts obtained from transcription and corresponding to part of audio data, such as "today", "today's weather", and "today's weather is really", while a transcript obtained from transcription and corresponding to the complete audio data is "Today's weather is really good".

In the present embodiment, after obtaining a transcript, the service server may further set a sentence identifier for the transcript, and the sentence identifier may uniquely identify audio data corresponding to each sentence in a specific real-time interactive scene, and may be composed of at least one element such as letters, words, numbers, and special symbols. A process of setting the sentence identifier corresponding to the transcript by the service server may be: updating the sentence identifier of the transcript according to a change of the current to-be-transcribed audio data. The service server may send the sentence identifier of the transcript to the client at the same time as the transcript.

The implementation of setting the sentence identifier by the service server may be, for example, firstly, when text transcription of the current to-be-transcribed audio data is completed, setting a updating mark of the sentence identifier; then, when a transcript of new current to-be-transcribed audio data in a text transcribing process is obtained, updating the sentence identifier according to the updating mark, and cancelling the updating mark when the sentence identifier is updated completely. For example, a sentence identifier corresponding to audio data of a first sentence is Seg1, and a sentence identifier updating mark is set after text transcription of the audio data of the first sentence is completed. Then, when a transcript corresponding to a first intermediate transcription result of audio data of a second sentence is obtained, the sentence identifier may be updated to Seg2 according to the updating mark, and the updating mark may be cancelled to avoid a sentence identifier of a transcript corresponding to a next intermediate transcription result of audio data of a second sentence being updated. In other words, when a transcript of the new current to-be-transcribed audio data is obtained from a subsequent transcription in the text transcribing process, it is not necessary to update the sentence identifier.

In addition, when an obtained transcript corresponding to the new current to-be-transcribed audio data is also a transcript of complete transcription, the sentence identifier may be updated according to the updating mark, and the updating mark may be kept. Still taking the above scene as an example, if the second sentence is very short, and an obtained first transcript of the audio data of the second sentence is already a transcript of complete transcription, then at this time, in addition to updating the sentence identifier to Seg2 according to the updating mark, it is necessary to keep the updating mark, so that when a transcript corresponding to a next sentence is obtained, the sentence identifier is updated again according to the updating mark.

The updating the sentence identifier may be, for example, generating a new sentence identifier which is different from a historical sentence identifier in the specific real-time interactive scene; and when the sentence identifier includes an ordered number, for example, including a, b, c, . . . ; 1, 2, 3, . . . ; I, II, III, . . . etc., the sentence identifiers may also be updated in numerical order, for example, the sentence identifiers may be updated in sequence to S1, S2, S3, . . . etc. By enabling the sentence identifier to include the ordered number, it is beneficial for the client to display captions according to the numerical order of the sentence identifier, and it is convenient for the user to know correct context of each sentence, improving the user's experience of reading captions.

The implementation of updating sentence identifiers mentioned above aims to realize that "sentence identifiers of transcripts transcribed from audio data corresponding to a same sentence are the same, while sentence identifiers of transcripts transcribed from audio data corresponding to different sentences are different", and other implementations that may achieve the same purpose mentioned above may also be applied here, which are not specifically limited herein.

S120, reading a local sentence identifier, and when the received sentence identifier is the same as the local sentence identifier, updating a displayed caption content corresponding to the local sentence identifier with the transcript.

In the embodiments of the present disclosure, the client may store a sentence identifier received for the first time in a local first preset storage space; when a sentence identifier is received for the second time, all sentence identifiers read from the first preset storage space may be used as the local sentence identifier; when the sentence identifier received for the first time is the same as any sentence identifier in the local sentence identifier, the local sentence identifier is not updated; and when the sentence identifier received for the second time and each sentence identifier in the local sentence identifier are different, the sentence identifier received for the second time may be added to the first preset storage space to update the local sentence identifier. After that, the above operation may be repeated every time when the client receives a sentence identifier, so as to realize an operation of updating or not updating the local sentence identifier.

The received sentence identifier is the same as the local sentence identifier, then it may be considered that there is a same sentence identifier in the local sentence identifier of the client, that is, a transcript of the same sentence identifier previously received by the client and a transcript received at this time correspond to audio data of a same sentence. The updating the displayed caption content corresponding to the local sentence identifier with the transcript may be updating, by the client, the displayed caption content corresponding to the local sentence identifier which is identical with the received sentence identifier with the received transcript, specifically, a transcript of a caption corresponding to the identical local sentence identifier in a display control may be updated to the received transcript to realize dynamic update of the caption content.

In addition, when the sentence identifier received by the client is different from the local sentence identifier, it may be considered that the transcript previously received by the client and the transcript received at this time are transcript transcribed from audio data of different sentences. At this time, the client may display the transcript as a new caption content, and update the local sentence identifier with the received sentence identifier. Herein, when displaying the transcript as the new caption content, the client may display the transcript in any way which may be different from that of other received transcript. Specifically, in some application scenes, displaying the transcript as the new caption content may be, for example, generating a new display control for captions, and importing the received transcript into the new display control to realize displaying a new caption. When the new caption is displayed, a previous caption may slide to other positions of a client interface (for example, the previous caption scrolls upward in sequence). Moreover, a caption content in the new caption may also be updated with a transcript which is subsequently received by the client and corresponds to a same sentence identifier with the caption content. The updating, by the client, the local sentence identifier with the received sentence identifier may be, for example, adding the received sentence identifier to the local first preset storage space.

The updating displayed caption content corresponding to the local sentence identifier with the transcript may be determining a difference content between the received transcript and the displayed caption content corresponding to the local sentence identifier which is identical with the received sentence identifier, and updating the caption content with the difference content. Due to a streaming processing mode of audio data, a content which is transcribed first in the text transcribing process may have errors, but the errors may be corrected forward according to a content transcribed subsequently. For example, for audio data of a sentence "the studio is transparent and bright", transcript received by the client for the first time may be "while on duty", which may be displayed as "while on duty . . . " when captions are displayed; and a content received subsequently by the client may be "the studio is transparent", thus when a caption content is updated, it may first be determined that differences between the received transcript and the displayed caption content corresponding to a same local sentence identifier include difference between "room" and "hour" and addition of "transparent", and then "hour" in a displayed caption content may be changed to "room" according to the differences, and then "transparent" is added, so as to realize updating a caption content.

In an embodiment of the present disclosure, the updating displayed caption content corresponding to the local sentence identifier with the transcript includes replacing the displayed caption content corresponding to the local sentence identifier with the transcript. In other words, the client may replace the displayed caption content corresponding to the local sentence identifier which is identical with the received sentence identifier with the received transcript. For example, for the audio data of the sentence "today's weather is really good", if a transcript first received by the client is "today", a caption may be displayed as "today . . . " when displayed; and if a transcript received subsequently is "today's weather", a display content may be replaced to "today's weather" when the caption is displayed. By replacing the displayed caption content corresponding to the local sentence identifier with the transcript, a calculation process of the client may be reduced, and updating the caption content more quickly may be realized.

Since the caption content can be dynamically updated, when displaying a corresponding transcript for audio data of a sentence, it is not necessary to wait until the audio data of the sentence is transcribed completely before displaying a transcribed transcript, instead, when a transcript corresponding to a first intermediate transcription result of the sentence is received, the transcript may be displayed through captions, and each time new transcript corresponding to an intermediate transcription result of the sentence is received, the new transcript may be used to dynamically update the captions. Therefore, latency delay of each sentence from being spoken by a speaker to being displayed as a caption may be reduced, greatly improving user experience.

In an embodiment of the present disclosure, the client is a client of a real-time interactive application. Herein, the real-time interactive application may include but is not limited to at least one of an instant messaging application, a multi-media conference application, a live video application and a group chat interactive application. When more than two clients are engaged in an instant communication, a multi-media conference, a group chat interaction or in a same live room, captions may be displayed for what a speaker said by the above information processing method, so as to improve real-time interaction efficiency and interaction experience.

In the technical solutions of the embodiments of the present disclosure, the client receives the transcript and the sentence identifier of the transcript sent by the service server; reads the local sentence identifier, and when the received sentence identifier is the same as the local sentence identifier, updates the displayed caption content corresponding to the local sentence identifier with the transcript. When the received sentence identifier of the client is the same as the local sentence identifier, the displayed caption content is replaced with the received transcript, which can realize displaying the caption when the first intermediate transcription result of the sentence is received and dynamically updating the caption content corresponding to the sentence when the subsequent intermediate transcription result of the sentence is received in the process of transcribing the audio data of the same sentence into text, which not only realizes dynamically displaying the captions of each sentence, but also reduces the latency delay of displaying the captions of each sentence, and improves the user experience.

Second Embodiment

Figure 2:
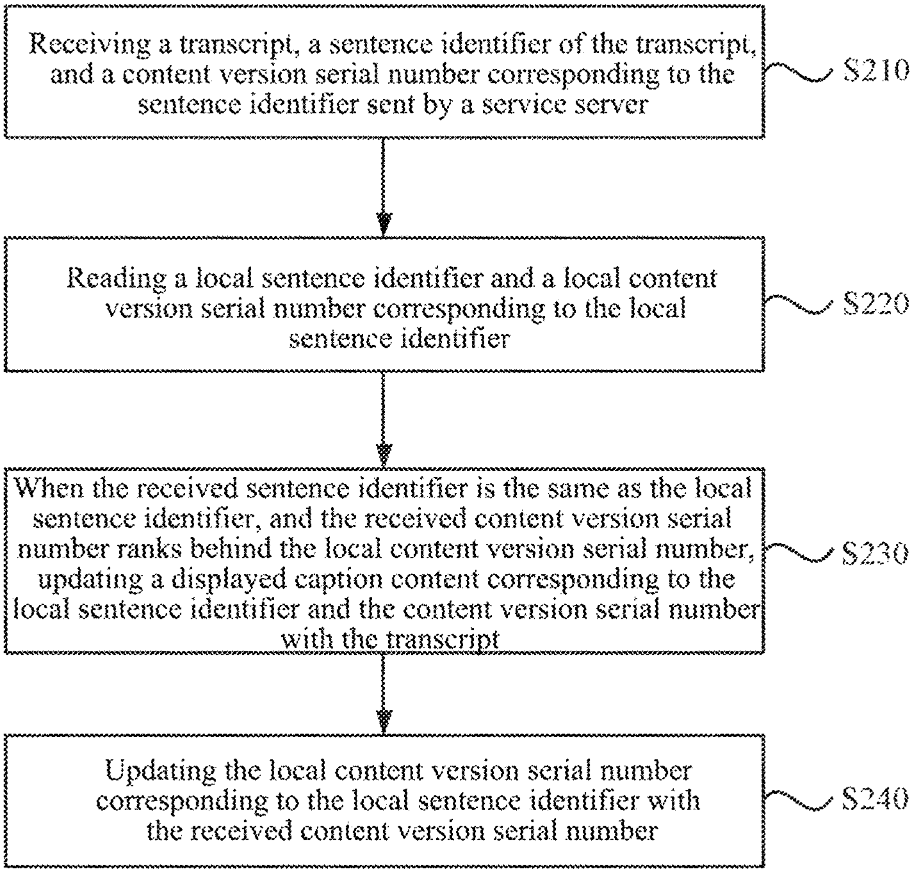
FIG. 2 is a flow diagram of an information processing method provided in a second embodiment of the present disclosure.

FIG. 2 is a flow diagram of an information processing method provided in a second embodiment of the present disclosure. The present embodiment may be combined with alternatives of each information processing method provided in the above embodiments. In the information processing method provided by the present embodiment, while receiving a transcript and a sentence identifier of the transcript sent by a service server, the client may receive a content version serial number corresponding to the sentence identifier sent by the service server, and may display the transcript in captions with the sentence identifier and a corresponding content version serial number thereof, which may effectively avoid a situation that a caption update error is caused by updating a transcript in a lower ranking with a transcript in an upper ranking when the transcript in an upper ranking is sent to the client subsequently due to network delay and other reasons.

As shown in FIG. 2, the information processing method provided by the present embodiment includes:

S210, receiving a transcript, a sentence identifier of the transcript, and a content version serial number corresponding to the sentence identifier sent by a service server.

In the present embodiment, the content version serial number received by the client may uniquely identify a transcription order of the transcript in a text transcribing process of corresponding current to-be-transcribed audio data, and may include ordered numbers, for example, a, b, c, . . . ; 1, 2, 3, . . . ; I, II, III, etc., or further include at least one other element such as letters, words, numbers and special symbols.

The service server may further set a content version serial number corresponding to the sentence identifier while setting the sentence identifier for the transcript. An implementation of setting the content version serial number by the service server may be, for example, generating, according to the transcription order of the transcript in the text transcribing process of the current to-be-transcribed audio data, the content version serial number corresponding to the sentence identifier. It may be considered that the sentence identifiers of the transcript transcribed from the current to-be-transcribed audio data are the same, and a content version serial number of a transcript transcribed at this time may be generated according to a transcription order of the transcript transcribed at this time in the text transcribing process.

For example, for the audio data of the sentence "today's weather is really good", transcript transcribed therefrom may be "today", "today's weather", "today's weather is really", and "today's weather is really good" in sequence, and sentence identifiers corresponding to the above transcript are the same, however, a content version serial number of "today" transcribed at the first time may be set to Slice1; a content version serial number of "today's weather" transcribed at the second time may be set to Slice2; a content version serial number of "today's weather is really" transcribed at the third time may be set to Slice3; and a content version serial number of "today's weather is really good" transcribed at the fourth time may be set to Slice4.

S220, reading a local sentence identifier and a local content version serial number corresponding to the local sentence identifier.

In the present embodiment, the client may read the local sentence identifier from a local first preset storage space, and may read the local content version serial number from a local second preset storage space. When the size of the first preset storage space can satisfy storing both sentence identifiers and content version serial numbers, the first preset storage space may be used as the second preset storage space at the same time.

S230, when the received sentence identifier is the same as the local sentence identifier, and the received content version serial number ranks behind the local content version serial number, updating a displayed caption content corresponding to the local sentence identifier and the content version serial number with the transcript.

In the present embodiment, when there is a same sentence identifier as the received sentence identifier in the local sentence identifier of the client, and the received content version serial number is ranked behind the local content version serial number of the same local sentence identifier (which may not include being equal to the local content version serial number), it may be considered that the previously received transcript of the same sentence identifier and the transcript received at this time correspond to audio data of a same sentence, and a transcription order of the transcript received at this time is lower than that of the transcript received at last time. At this time, the client may update a displayed caption content corresponding to the same local sentence identifier and the local content version serial number with the transcript.

In addition, when the sentence identifier received by the client is the same as the local sentence identifier and the received content version serial number is ahead of the local content version serial number, a caption content corresponding to the local sentence identifier and the local content version serial number may not be updated. For example, assuming that the client receives "today's weather is really" corresponding to Slice3 after receiving "today's weather is really good" with a content version serial number Slice4 and dynamically updating display of captions, since Slice3 ranks ahead of Slice4, it is not necessary to update "today's weather is really good" with "today's weather is really" at this time, avoiding a situation of update errors.

S240, updating the local content version serial number corresponding to the local sentence identifier with the received content version serial number.

For each sentence identifier, the client stores the received first content version serial number corresponding to the sentence identifier in the second preset storage space; when receiving the second content version serial number corresponding to the sentence identifier, reads all content version serial numbers corresponding to the sentence identifier from the second preset storage space as the local content version serial number; and when the second content version serial number ranks behind all the local content version serial number, adds the second content version serial number in the second preset storage space to update the local content version serial number; when the second content version serial number ranks ahead of any local content version serial number (which may include being equal to the local content version serial number), the local content version serial number is not updated. After that, the above operation may be repeated every time when the client receives a content version serial number corresponding to the sentence identifier, so as to realize an operation of updating or not updating the local content version serial number.

In the technical solutions of the embodiments of the present disclosure, while receiving the transcript and the sentence identifier of the transcript sent by the service server, the client may further receive the content version serial number corresponding to the sentence identifier, and may display the transcript in captions with the sentence identifier and the content version serial number corresponding thereto. By updating a transcript corresponding to a content version serial number in an upper ranking with a transcript corresponding to a content version serial number in a lower ranking when the received sentence identifier is the same as the local sentence identifier, the transcript corresponding to the top ranked content version serial number is updated by using the bottom ranked content version serial number, which may effectively avoid a situation that a caption update error is caused by updating a transcript in a lower ranking with a transcript in an upper ranking when the transcript in an upper ranking is sent to the client subsequently due to network delay and other reasons, further improving display effect of captions.

Third Embodiment

Figure 3:
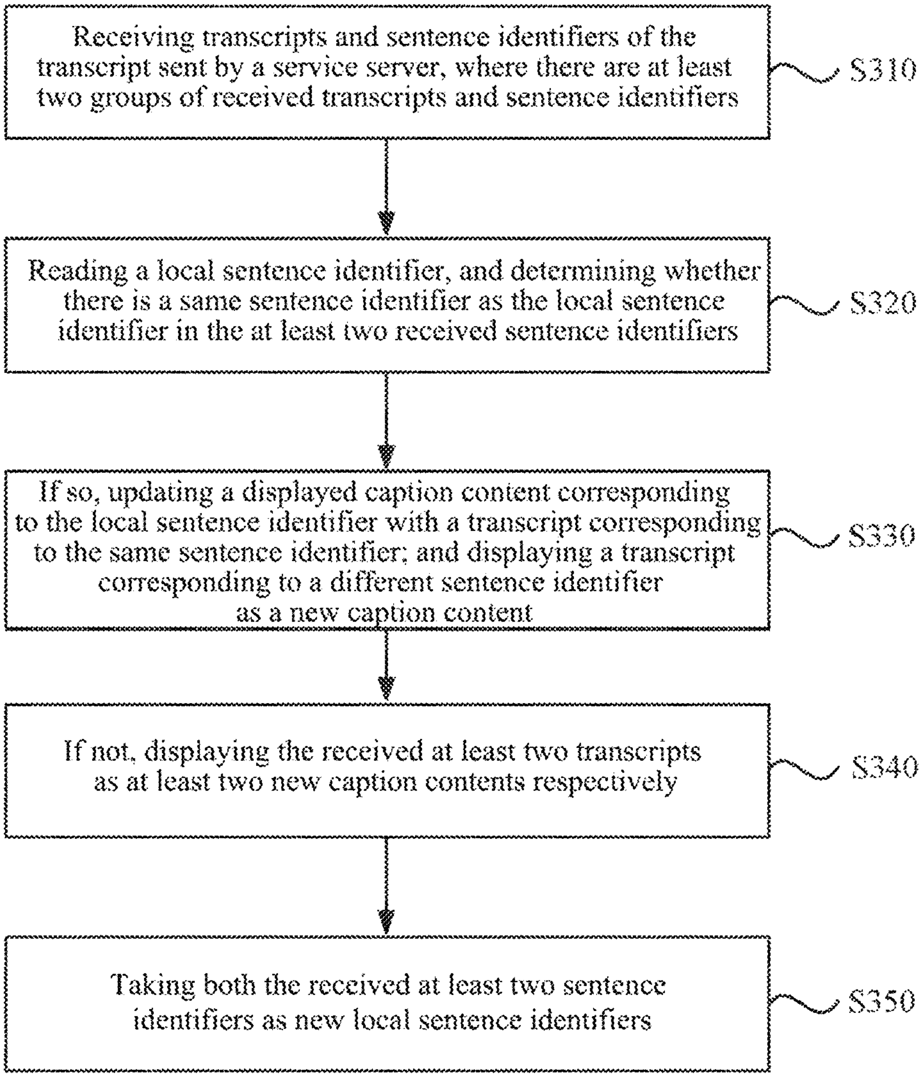
FIG. 3 is a flow diagram of an information processing method provided in a third embodiment of the present disclosure.

FIG. 3 is a flow diagram of an information processing method provided by a third embodiment of the present disclosure. The present embodiment may be combined with alternatives of each information processing method provided in the above embodiments. The information processing method provided by the present embodiment optimizes the caption dynamically displaying method when there are at least two groups of received transcripts and sentence identifiers, which may realize dynamic updating of a plurality of captions at the same time, and further improve display effect of captions.

As shown in FIG. 3, the information processing method provided by the present embodiment includes:

S310, receiving transcripts and sentence identifiers of the transcript sent by a service server, where there are at least two groups of received transcripts and sentence identifiers.

In the embodiments of the present disclosure, the service server may pull, according to a caption enabling request, at least two channels of audio data simultaneously uploaded by at least two clients among the client and other clients in interactive communication with the client from a streaming media server (that is, there are more than two speakers talking at the same time); and obtain transcripts in a text transcribing process of current to-be-transcribed audio data in the at least two channels of audio data respectively, and update sentence identifiers of the transcripts according to changes of at least two channels of current to-be-transcribed audio data. It may be considered that if there are at least two channels of current to-be-transcribed audio data, sentence identifiers may be set for the at least two channels of audio data respectively, without setting a sentence identifier updating mark when one channel of audio data is transcribed completely and updating according to the sentence identifier updating mark. At this time, the client may receive at least two groups of transcripts and sentence identifiers sent simultaneously or alternately by the service server, and then dynamically update display of at least two captions simultaneously according to the at least two groups of transcripts and sentence identifiers.

S320, reading a local sentence identifier, and determining whether there is a same sentence identifier as the local sentence identifier in the at least two received sentence identifiers.

In the present embodiment, the number of the local sentence identifier may be at least one, and the determining whether there is a same sentence identifier as the local sentence identifier in the at least two received sentence identifiers is namely determining whether there is an intersection between the at least two received sentence identifiers and the local sentence identifier.

S330, if so, updating a displayed caption content corresponding to the local sentence identifier with a transcript corresponding to the same sentence identifier; and displaying a transcript corresponding to a different sentence identifier as a new caption content.

In the present embodiment, if there is the same sentence identifier among the at least two sentence identifiers received by the client and the local sentence identifier, and the number of the same sentence identifier may be at least one, it may be considered that there is the transcript for updating the displayed caption content in the received transcript, and the displayed caption content corresponding to the same local sentence identifier may be updated with the transcript corresponding to the received same sentence identifier. At the same time, the transcript corresponding to the sentence identifier different from the local sentence identifier may be displayed as a new caption content. Therefore, in a situation, for example, when a previous speaker has not finished speaking, a new speaker starts to speak, and at least two speakers are speaking, a plurality of captions may be updated and displayed simultaneously.

S340, if not, displaying the received at least two transcripts as at least two new caption contents respectively.

In the present embodiment, if there is no same sentence identifier among the at least two sentence identifiers received by the client and the local sentence identifier, it may be considered that the received transcript and the displayed caption content do not belong to a same sentence, and at this time, the received at least two transcripts may be displayed as the at least two new caption contents respectively. Therefore, in a situation, for example, when a previous speaker finishes speaking, at least two new speakers start to speak at the same time, and the at least two speakers speak, a plurality of captions are updated and displayed at the same time.

S350, taking both the received at least two sentence identifiers as new local sentence identifiers.

In the present embodiment, if there is the same sentence identifier among the received at least two sentence identifiers and the local sentence identifier, a sentence identifier different from the local sentence identifier may be added to a first preset storage space, so that both the received at least two sentence identifiers may be used as new local sentence identifiers. If there is no sentence identifier identical to the local sentence identifier in the received at least two sentence identifiers, both the received at least two sentence identifiers may be added to the first preset storage space, so that both the received at least two sentence identifiers may be used as new local sentence identifiers.

In the technical solutions of the embodiments of the present disclosure, when there are at least two groups of the received transcripts and sentence identifiers, after reading the local sentence identifier, the client determines whether there is a sentence identifier identical to the local sentence identifier in the received at least two sentence identifiers; if so, the displayed caption content corresponding to the local sentence identifier is updated with the transcript corresponding to the same sentence identifier, and the transcript corresponding to a different sentence identifier is used as new caption contents; if not, the received at least two transcripts are displayed as at least two new caption contents respectively, and both the received at least two sentence identifiers are used as new local sentence identifiers. Dynamically updating a plurality of captions at a same time may be realized, and display effect of captions is further improved.

Fourth Embodiment

Figure 4:
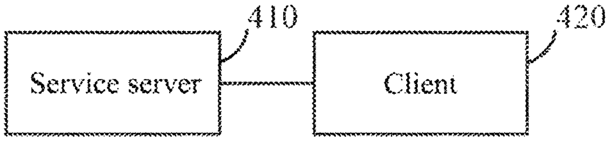
FIG. 4 is a schematic structural diagram of an information processing system provided in a fourth embodiment of the present disclosure.

FIG. 4 is a schematic structural diagram of an information processing system provided in a fourth embodiment of the present disclosure. In the information processing system provided by the present embodiment, through a mutual cooperation between a service server and a client, it can be realized that in a real-time interactive scene, the service server may pull interactive audio data, obtain a transcript transcribed from the audio data and generate a sentence identifier corresponding to the transcript; and the client dynamically updates and displays a caption content according to the received transcript and sentence identifier sent by the service server. The information processing system provided by the embodiments of the present disclosure belongs to a same inventive concept as the information processing method provided by any embodiment of the present disclosure, and the above embodiments may be referred to for undisclosed technical details which may achieve same beneficial effects as the above embodiments.

As shown in FIG. 4, the information processing system provided by the present embodiment includes:

a service server 410, configured to pull audio data in response to a caption enabling request sent by a client 420, obtain a transcript of current to-be-transcribed audio data in the audio data during a text transcribing process, and update a sentence identifier of the transcript according to a change of the current to-be-transcribed audio data; and the client 420, configured to receive the transcript and the sentence identifier of the transcript sent by the service server 410; read a local sentence identifier, and when the received sentence identifier is the same as the local sentence identifier, update a displayed caption content corresponding to the local sentence identifier with the transcript.

In the embodiments of the present disclosure, a caption enabling request sent by the client may carry an identity identifier representing the client or an identifier representing a real-time interactive room such as a conference room and a live room where the client is located, and the service server may pull audio data uploaded by the client and other clients interacting with the client from the streaming media server according to the above identifier.

The service server may send the audio data to a real-time speech transcribing tool, so that the real-time speech transcribing tool segments audio data based on an ASR technology, to determine audio data corresponding to each sentence, and can also take audio data corresponding to a to-be-transcribed current sentence as current to-be-transcribed audio data, and perform a text transcribing operation on the current to-be-transcribed audio data which can output an intermediate transcription result; the service server obtains a transcript transcribed from the current to-be-transcribed audio data from the real-time speech transcribing tool, and the obtained transcript includes a transcript of the current to-be-transcribed audio data in a transcribing process and a transcript of complete transcription.

After obtaining the transcript, the service server may further set a sentence identifier for the transcript, and the sentence identifier may uniquely identify audio data corresponding to each sentence in a specific real-time interactive scene, and may be composed of at least one element such as letters, words, numbers, and special symbols. A process of setting the sentence identifier corresponding to the transcript by the service server may be: updating the sentence identifier of the transcript according to a change of the current to-be-transcribed audio data. The service server may send the sentence identifier of the transcript to the client at the same time as the transcript.

The implementation of setting the sentence identifier by the service server may be, for example: when text transcription of the current to-be-transcribed audio data is completed, setting an updating mark of the sentence identifier; and when a transcript of new current to-be-transcribed audio data in a text transcribing process is obtained, updating the sentence identifier according to the updating mark, and cancelling the updating mark when the sentence identifier is updated completely. In addition, when the transcript of the new current to-be-transcribed audio data is obtained from a subsequent transcription in the text transcribing process, it is not necessary to update the sentence identifier. In addition, when the obtained transcript corresponding to the new current to-be-transcribed audio data is also transcript of complete transcription, the sentence identifier may be updated according to the updating mark, and the updating mark may be kept.

When there is a plurality of clients that send the caption enabling request, the service server may generate an initial sentence identifier for a certain client when obtaining a first transcript requested by the client for each client after receiving the caption enabling request sent by each client, and set a sentence identifier of the transcript according to a transcript obtained subsequently and requested by the client. It may be considered that the service server may maintain relationships between each client and a sentence identifier corresponding to the client, and may send the sentence identifier corresponding to each client to a corresponding client, so as to ensure that the service server can provide a caption display service function for a plurality of clients at the same time.

The client can store the sentence identifier received for the first time in the local first preset storage space; when the sentence identifier is received for the second time, all the sentence identifiers read from the first preset storage space can be used as local sentence identifiers; when the second received sentence identifier is the same as any sentence identifier in the local sentence identifier, the local sentence identifier is not updated; when the second received sentence identifier and each sentence identifier in the local sentence identifier are different, the second received sentence identifier can be added to the first preset storage space to update the local sentence identifier. After that, the above operation may be repeated every time when the client receives a sentence identifier, so as to realize an operation of updating or not updating the local sentence identifier.

The client may read the local sentence identifier from the first preset storage space after receiving the transcript and the sentence identifier sent by the service server. When the sentence identifier received by the client is the same as the local sentence identifier, it may be considered that the transcript of the same sentence identifier previously received by the client and the transcript received at this time correspond to audio data of a same sentence. At this time, the client may update the displayed caption content corresponding to the local sentence identifier which is identical with the received sentence identifier with the received transcript. In addition, when the sentence identifier received by the client is different from the local sentence identifier, it may be considered that the transcript previously received by the client and the transcript received at this time are transcripts transcribed from audio data of different sentence, at this time, the client may display the received transcript as a new caption content and update the local sentence identifier with the received sentence identifier. The updating displayed caption content corresponding to the local sentence identifier with the transcript includes replacing the displayed caption content corresponding to the local sentence identifier with the transcript.

In an embodiment of the present disclosure, the service server is further configured to: generate, according to the transcription order of the transcript in the text transcribing process of the current to-be-transcribed audio data, the content version serial number corresponding to the sentence identifier.

Correspondingly, the client is further configured to: read a local content version serial number corresponding to the local sentence identifier; when the received sentence identifier is the same as the local sentence identifier and the received content version serial number ranks behind the local content version serial number, replace a displayed caption content corresponding to the local sentence identifier and the content version serial number with the transcript; and update the local content version serial number corresponding to the local sentence identifier with the received content version serial number.

In the present embodiment, the service server may further set a content version serial number corresponding to the sentence identifier while setting the sentence identifier for the transcript. An implementation of setting the content version serial number by the service server may be, for example, generating, according to the transcription order of the transcript in the text transcribing process of the current to-be-transcribed audio data, the content version serial number corresponding to the sentence identifier. It may be considered that the sentence identifiers of the transcript transcribed from the current to-be-transcribed audio data are the same, and a content version serial number of a transcript transcribed at this time may be generated according to a transcription order of the transcript transcribed at this time in the text transcribing process.

For each sentence identifier, the client stores the received first content version serial number corresponding to the sentence identifier in the second preset storage space; when receiving the second content version serial number corresponding to the sentence identifier, reads all content version serial numbers corresponding to the sentence identifier from the second preset storage space as the local content version serial number; and when the second content version serial number ranks behind all the local content version serial number, adds the second content version serial number in the second preset storage space to update the local content version serial number; when the second content version serial number ranks ahead of any local content version serial number (which may include being equal to the local content version serial number), the local content version serial number is not updated. After that, the above operation may be repeated every time when the client receives a content version serial number corresponding to the sentence identifier, so as to realize an operation of updating or not updating the local content version serial number.

When there is a sentence identifier that is the same as the received sentence identifier in the local sentence identifier of the client, and the received content version serial number is ranked behind the local content version serial number of the same local sentence identifier (which may not include being equal to the local content version serial number), it may be considered that the previously received transcript of the same sentence identifier and the transcript received at this time correspond to audio data of a same sentence, and the transcription order of the transcript received at this time is lower than that of the transcript received at last time. At this time, the client may update a displayed caption content corresponding to the same local sentence identifier and the local content version serial number with the transcript. In addition, when the sentence identifier received by the client is the same as the local sentence identifier and the received content version serial number is ahead of the local content version serial number, a caption content corresponding to the local sentence identifier and the local content version serial number may not be updated.

In the information processing system provided by the embodiments of the present disclosure, the service server pulls the audio data in response to the caption enabling request sent by the client, obtains the transcript of the to-be-transcribed audio data in the audio data in the text transcribing process, and updates the sentence identifier of the transcript according to changes of the to-be-transcribed audio data, so that the client can dynamically update and display the caption content according to the received transcript and sentence identifier. By setting different transcripts obtained in the process of transcribing the current to-be-transcribed audio data to a transcript with a same sentence identifier, the service server may instruct the client to update the displayed caption content with the transcript received subsequently for the same current to-be-transcribed audio data. It can be realized that, in a process of sending the transcript transcribed from audio data of a same sentence by the service server, the client displays the caption when the first intermediate transcription result of the sentence is received and dynamically updates the caption content corresponding to the sentence when the subsequent intermediate transcription result of the sentence is received, which not only realizes dynamically displaying the captions of each sentence, but also reduces the latency delay of displaying the captions of each sentence, and improves the user experience.

In addition, the service server may further update the content version serial number corresponding to the sentence identifier while updating the sentence identifier, so that the client can further update a transcript of a content version serial number in an upper ranking according to that in a lower ranking, which may avoid a situation that a caption update error is caused by updating a transcript in a lower ranking with a transcript in an upper ranking when the transcript in an upper ranking is sent to the client subsequently due to network delay and other reasons.

Fifth Embodiment

The present embodiment may be combined with various alternatives of the information processing system provided by the above embodiments. The information processing system provided by the present embodiment optimizes caption dynamic display when there are at least two groups of transcripts and sentence identifiers, which may realize that a client dynamically updates a plurality of captions at the same time, and further improve display effect of captions.

In the information processing system provided by the present embodiment, the service server is configured to:

pull at least two channels of audio data in response to a caption enabling request, obtain transcripts of current to-be-transcribed audio data in the at least two channels of audio data during a text transcribing process, and update sentence identifiers of the transcripts according to changes of at least two channels of current to-be-transcribed audio data; and accordingly, the client is configured to:

when there are at least two groups of received transcripts and sentence identifiers, read a local sentence identifier, and determining whether there is a same sentence identifier as the local sentence identifier in the at least two received sentence identifiers;

if so, replace a displayed caption content corresponding to the local sentence identifier with a transcript corresponding to the same sentence identifier; and displaying a transcript corresponding to a different sentence identifier as a new caption content;

if not, display the received at least two transcripts as at least two new caption contents respectively; and take both the received at least two sentence identifiers as new local sentence identifiers.

In the embodiments of the present disclosure, the service server may pull, according to the caption enabling request, at least two channels of audio data simultaneously uploaded by at least two clients among the client and other clients in interactive communication with the client from a streaming media server (that is, there are more than two speakers talking at the same time); and obtain transcripts of current to-be-transcribed audio data in the at least two channels of audio data in a text transcribing process respectively, and update sentence identifiers of the transcripts according to changes of at least two channels of current to-be-transcribed audio data. It may be considered that if there are at least two channels of current to-be-transcribed audio data, sentence identifiers may be set for the at least two channels of audio data respectively, without setting a sentence identifier updating mark when one channel of audio data is transcribed completely and updating according to the sentence identifier updating mark. At this time, the client may receive at least two groups of transcripts and sentence identifiers sent simultaneously or alternately by the service server, and then dynamically update display of at least two captions simultaneously according to the at least two groups of transcripts and sentence identifiers.

In the present embodiment, if there is the same sentence identifier among the at least two sentence identifiers received by the client and the local sentence identifier, and the number of the same sentence identifier may be at least one, it may be considered that there is the transcript for updating the displayed caption content in the received transcript, and the displayed caption content corresponding to the same local sentence identifier may be updated with the transcript corresponding to the received same sentence identifier. At the same time, the transcript corresponding to the sentence identifier different from the local sentence identifier may be displayed as a new caption content. Therefore, in a situation, for example, when a previous speaker has not finished speaking, a new speaker starts to speak, and at least two speakers are speaking, a plurality of captions may be updated and displayed simultaneously.

If there is no sentence identifier which is identical with the local sentence identifier in the at least two sentence identifiers received by the client, it may be considered that the received transcript and the displayed caption content do not belong to a same sentence, and at this time, the received at least two transcripts may be displayed as the at least two new caption contents respectively. Therefore, in a situation, for example, when a previous speaker finishes speaking, at least two new speakers start to speak at the same time, and the at least two speakers speak, a plurality of captions are updated and displayed at the same time.

In the present embodiment, if there is the same sentence identifier among the received at least two sentence identifiers and the local sentence identifier, a sentence identifier different from the local sentence identifier may be added to a first preset storage space, so that both the received at least two sentence identifiers may be used as new local sentence identifiers. If there is no sentence identifier identical to the local sentence identifier in the received at least two sentence identifiers, both the received at least two sentence identifiers may be added to the first preset storage space, so that both the received at least two sentence identifiers may be used as new local sentence identifiers.

In the information processing system provided by the embodiments of the present disclosure, the service server may pull the at least two channels of audio data in response to the caption enabling request sent by the client, obtain the transcripts of the to-be-transcribed audio data in the at least two channels of audio data in the text transcribing process, and update the sentence identifiers of the transcripts according to changes of the at least two channels of to-be-transcribed audio data, so that the client can dynamically update and display a plurality of caption content simultaneously according to the received at least two groups of transcripts and sentence identifiers.

Sixth Embodiment

Figure 5:
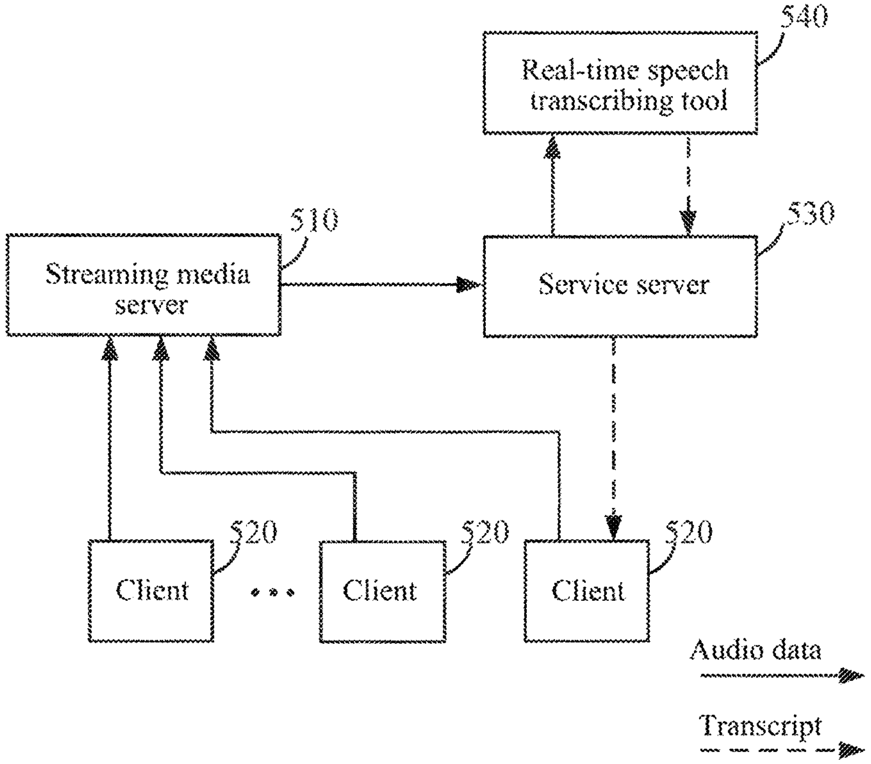
FIG. 5 is a schematic structural diagram of an information processing system provided in a sixth embodiment of the present disclosure.

FIG. 5 is a schematic structural diagram of an information processing system provided by a sixth embodiment of the present disclosure. The present embodiment may be combined with various alternatives in the information processing system provided by the above embodiments. The information processing system provided by the present embodiment may further include: a streaming media server configured to receive audio data uploaded by a client for streaming media communication; and correspondingly, the service server is specifically configured to pull audio data from the streaming media server in response to the caption enabling request sent by the client. The information processing system provided by the present embodiment may further include a real-time speech transcribing tool configured to receive the audio data sent by the service server, determine current to-be-transcribed audio data of the audio data, and feedback a transcript of the current to-be-transcribed audio data during the text transcribing process; and correspondingly, the service server is specifically configured to receive the transcript of the current to-be-transcribed audio data in the audio data during the text transcribing process, which is fed back by the real-time speech transcribing tool. Storage of audio data uploaded by each client may be realized through the streaming media server; and real-time transcription from audio data to a transcript and outputting an immediate transcription result may be realized through the real-time speech transcribing tool.

As shown in FIG. 5, the information processing system provided by the present embodiment includes:

a streaming media server 510, configured to receive audio data uploaded by a client 520 for streaming media communication;

a service server 530, configured to pull audio data from the streaming media server 510 in response to a caption enabling request sent by the client 520;

a real-time speech transcribing tool 540, configured to receive audio data sent by the service server 530, determine current to-be-transcribed audio data, and feedback a transcript of the current to-be-transcribed audio data during a text transcribing process, the service server 530 is further configured to receive the transcript of the current to-be-transcribed audio data in the audio data during the text transcribing process, which is fed back by the real-time speech transcribing tool 540, and update a sentence identifier of the transcript according to changes of the current to-be-transcribed audio data;

and the client 520, configured to receive the transcript and the sentence identifier of the transcript sent by the service server 530; read a local sentence identifier, and when the received sentence identifier is the same as the local sentence identifier, update a displayed caption content corresponding to the local sentence identifier with the transcript.

In the embodiments of the present disclosure, any client that has real-time interactive communication with other clients may establish a communication with the streaming media server through a streaming media software development kit (SDK) in an interactive communication process, and may transmit multimedia data containing audio streams to the streaming media server through the established communication. The service server may also pull audio streams represented by each caption enabling request from the streaming media server through the streaming media SDK; the service server may interact with the real-time speech transcribing tool provided locally by the service server or provided by a third party establishing communications with the service server to realize sending audio data and obtaining a transcript; and the service server may further establish a long link with the client to send transcript and a sentence identifier of the transcript to the client.

In an embodiment of the present disclosure, the caption enabling request carries a requested caption language; and correspondingly, the service server is further configured to translate the obtained transcript according to the requested caption language, and send the translated transcript to the client.

The caption enabling request sent by the client to the server may carry the requested caption language, that is, the caption language which the client expects to see. Before sending the transcript, the service server may translate the transcript according to a caption language requested by a corresponding client. It is beneficial to realize that, for example, in a situation that a user performs a real-time interaction with other users with different native languages, through caption display, interaction efficiency between users is promoted, and the user experience is improved.

In an embodiment of the present disclosure, the caption enabling request carries a first identity identifier; correspondingly, the service server is specifically configured to: pull audio data uploaded by the client and a client corresponding to a second identity identifier which establishes communication relationship with the first identity identifier, and obtain an identity identifier of the pulled audio data; and correspondingly, the client is specifically configured to: receive an identity identifier sent by the service server and display the identity identifier while displaying a caption content.

The caption enabling request sent by the client to the server may carry the first identity identifier. The service server may maintain communication relationships established among identity identifiers, and query the second identity identifier with which the communication relationship is established according to the first identity identifier, so that the audio data uploaded by the client and the client corresponding to the second identity identifier with which the communication relationship is established with the first identity may be pulled. Moreover, when pulling audio data, the service server may further obtain an identity identifier of the pulled audio data (such as a nickname or an avatar, etc.) from the streaming media server at the same time, and may send the identity identifier to the client together with a transcript transcribed from corresponding audio data, so that the identity identifier corresponding to the caption content can be displayed while the caption content is displayed, which is convenient for the user to know the identity of the speaker and what the speaker said at the same time, and improves user experience.

The information processing system provided by the embodiments of the present disclosure further includes a streaming media server and/or a real-time speech transcribing tool, which may realize storing audio data uploaded by each client, and transcribing the audio data to a transcript in real time and outputting an intermediate transcription result respectively. In addition, the service server may further translate an obtained transcript according to caption language carried in the received caption enabling request, and send a translated transcript to the client, so that the client can display required language and improve the user experience. Furthermore, the service server may further send the identity identifier of the pulled audio data to the client, so that the client can display the identity of the speaker and improve the user experience.

Seventh Embodiment

Figure 6:
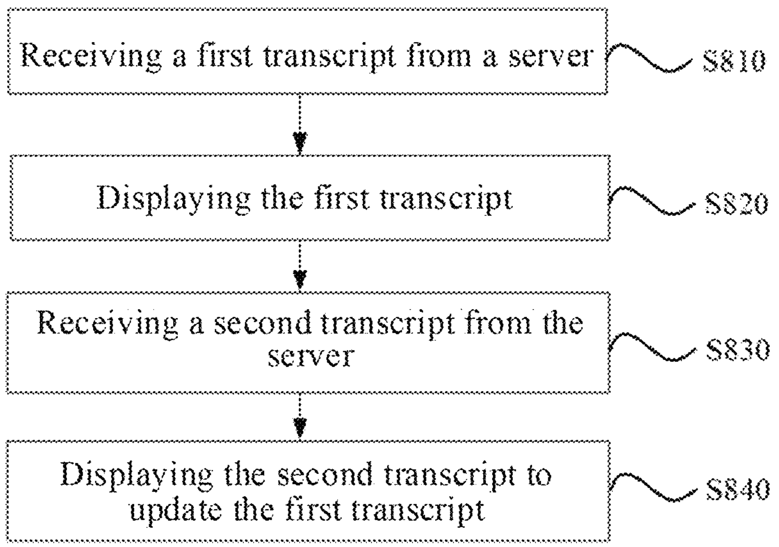
FIG. 6 is a flow diagram of an information processing method provided in a seventh embodiment of the present disclosure.

As shown in FIG. 6, the information processing method provided by the present embodiment includes:

S810, receiving a first transcript from a server;

S820, displaying the first transcript;

S830, receiving a second transcript from the server; and

S840, displaying the second transcript to update the first transcript.

In an embodiment of the present disclosure, the displaying the second transcript to update the first transcript includes:

displaying the second transcript to replace the first transcript; or, displaying a transcript updated based on a difference content between the first transcript and the second transcript.

In an embodiment of the present disclosure, the information processing method includes:

receiving a first transcript and a first sentence identifier of the first transcript from a service server;

displaying the first transcript;

receiving a second transcript and a second sentence identifier of the second transcript from the service server; and when the second sentence identifier is the same as the first sentence identifier, displaying the second transcript to update the first transcript.

In an embodiment of the present disclosure, the method further includes:

in response to the second sentence identifier being different from the first sentence identifier, displaying the first transcript and the second transcript.

In an embodiment of the present disclosure, while receiving the first transcript and the first sentence identifier of the first transcript from the service server, it further includes:

receiving a first content version serial number corresponding to the first sentence identifier from the service server;

while receiving the second transcript and the second sentence identifier of the second transcript from the service server, the method further includes:

receiving a second content version serial number corresponding to the second sentence identifier from the service server;

correspondingly, when the second sentence identifier is the same as the first sentence identifier, displaying the second transcript to update the first transcript, the method includes:

when the second sentence identifier is the same as the first sentence identifier, and the second content version serial number ranks behind the first content version serial number, displaying the second transcript to update the first transcript.

The displaying the first transcript, includes:

displaying the first transcript in a first display control, where the first display control is configured to perform caption display for the transcript from the service server.

In an embodiment of the present disclosure, the displaying the second transcript to update the first transcript includes:

displaying the second transcript in the first display control to replace the first transcript.

In an embodiment of the present disclosure, displaying the second transcript to update the first transcript includes:

in the first display control, displaying a transcript updated based on difference between the first transcript and the second transcript.

In an embodiment of the present disclosure, the method further includes:

when the second sentence identifier is different from the first sentence identifier, displaying the second transcript in a second display control, where the second display control is configured to display a transcript from the service server.

In an embodiment of the present disclosure, before the receiving the first transcript and the first sentence identifier of the first transcript from the service server, the method further includes:

sending a caption enabling request to the service server.

In an embodiment of the present disclosure, the caption enabling request includes an identity identifier representing the client or an identifier representing a place where the client is located.

In an embodiment of the present disclosure, the method further includes:

receiving an identity identifier of audio data from which a transcript is transcribed, wherein the audio data is pulled by the server according to the first identity identifier; and displaying the identity identifier of the audio data while displaying the transcript.

In an embodiment of the present disclosure, the caption enabling request includes language information of the transcript.

In an embodiment of the present disclosure, the method further includes:

receiving a translated transcript send by the server, wherein the translated transcript is translated according to the language information of the transcript; and displaying the translated transcript while displaying the transcript.

The information processing method provided by the embodiments of the present disclosure may be applied to any embodiment of the present disclosure.

Eighth Embodiment

Figure 7:
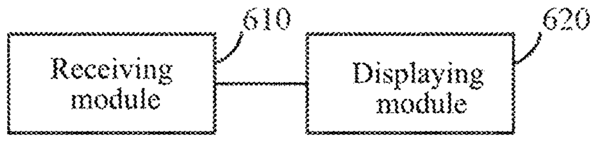
FIG. 7 is a schematic structural diagram of an information processing apparatus provided in an eighth embodiment of the present disclosure.

FIG. 7 is a schematic structural diagram of an information processing apparatus provided by an eighth embodiment of the present disclosure. The information processing apparatus provided by the present embodiment is applied to a client, especially when the client displays captions in a real-time interactive scene.

As shown in FIG. 7, the information processing apparatus provided in the present embodiment, applied to a client, includes:

a receiving module 610, configured to receive a transcript and a sentence identifier of the transcript sent by a service server; and a displaying module 620, configured to read a local sentence identifier, and when the received sentence identifier is the same as the local sentence identifier, update a displayed caption content corresponding to the local sentence identifier with the transcript.

On the basis of the above technical solutions, the receiving module, while receiving the transcript and the sentence identifier of the transcript sent by the service server, is further configured to: receive a content version serial number corresponding to the sentence identifier sent by the service server;

correspondingly, the displaying module is specifically configured to:

read the local sentence identifier and a local content version serial number corresponding to the local sentence identifier;

when the received sentence identifier is the same as the local sentence identifier, and the received content version serial number ranks behind the local content version serial number, update a displayed caption content corresponding to the local sentence identifier and the content version serial number with the transcript; and update the local content version serial number corresponding to the local sentence identifier with the received content version serial number.

On the basis of the above technical solutions, the display module is further configured to: when the received sentence identifier is different from the local sentence identifier, display the transcript as a new caption content, and update the local sentence identifier with the received sentence identifier.

On the basis of the above technical solutions, when there are at least two groups of the received transcripts and sentence identifiers, the display module is specifically configured to:

read a local sentence identifier, and determine whether there is a same sentence identifier as the local sentence identifier in the at least two received sentence identifiers;

if so, update a displayed caption content corresponding to the local sentence identifier with a transcript corresponding to the same sentence identifier; and display a transcript corresponding to a different sentence identifier as a new caption content;

if not, display the received at least two transcripts as at least two new caption contents respectively; and take both the received at least two sentence identifiers as new local sentence identifiers.

On the basis of the above technical solutions, the displaying module is specifically configured to replace a displayed caption content corresponding to the local sentence identifier with the transcript.

On the basis of the above technical solutions, the client is a client of a real-time interactive application, and the real-time interactive application includes at least one of an instant messaging application, a multi-media conference application, a live video application and a group chat interactive application.

The information processing apparatus provided by the embodiments of the present disclosure may execute the information processing method applied to the client provided by any embodiment of the present disclosure, and has corresponding functional modules and beneficial effects for executing the method.

It is worth noting that each unit and module included in the above apparatus is only divided according to functional logic, which, however, is not limited to the above division, as long as the corresponding functions can be realized; in addition, specific names of each functional unit are only for convenience of distinguishing each other, and are not used to limit scope of protection of the embodiments of the present disclosure.

Ninth Embodiment

In the following, please refer to FIG. 8, which shows a schematic structural diagram of an electronic device (such as the terminal device or the server in FIG. 8) 700 suitable for implementing the embodiments of the present disclosure. A terminal device in the embodiments of the present disclosure may include, but is not limited to, a mobile terminal such as a mobile phone, a laptop, a digital broadcast receiver, a PDA (Personal Digital Assistant), a PAD (a tablet computer), a PMP (Portable Multimedia Player), and an on-board terminal (for example, an on-board navigation terminal), etc., and a fixed terminal such as a digital TV and a desktop computer, etc. The electronic device shown in FIG. 8 is only an example, and should not cause any restriction on functions and application scope of the embodiments of the present disclosure.

Figure 8:
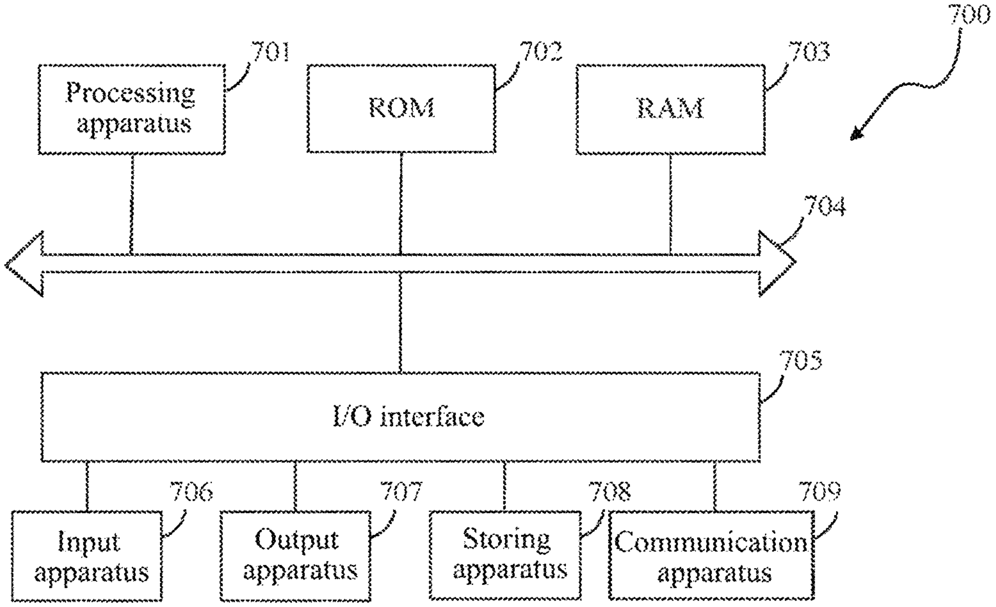
FIG. 8 is a schematic structural diagram of an electronic device provided in a ninth embodiment of the present disclosure.

As shown in FIG. 8, the electronic device 700 may include a processing apparatus (for example, a central processing unit, a graphics processor, etc.) 701, which may perform various appropriate actions and processes according to a program stored in a read-only memory (ROM) 702 or a program loaded into a random access memory (RAM) 703 from a storage apparatus 706. In the RAM 703, various programs and data required for operations of the electronic device 700 are also stored. The processing apparatus 701, the ROM 702 and the RAM 703 are connected to each other through a bus 704. An input/output (I/O) interface 705 is also connected to the bus 704.

Generally, following apparatuses may be connected to the I/O interface 705: an input apparatus 706 including, for example, a touch screen, a touch pad, a keyboard, a mouse, a camera, a microphone, an accelerometer, a gyroscope, etc.; an output apparatus 707, including, for example, a liquid crystal display (LCD), a speaker, a vibrator, etc.; a storage apparatus 708 including, for example, a magnetic tape, a hard disk, etc.; and a communication apparatus 709. The communication apparatus 709 may allow the electronic device 700 to perform a wireless or wired communication with other devices to exchange data. Although FIG. 8 shows an electronic device 700 with various apparatuses, it should be understood that it is not required to implement or provide all the apparatuses shown. More or fewer apparatuses may alternatively be implemented or provided.

Particularly, according to the embodiments of the present disclosure, a process described above with reference to a flowchart may be implemented as a computer software program. For example, the embodiments of the present disclosure include a computer program product, which includes a computer program carried on a non-transitory computer readable medium, and the computer program containing program codes for performing a method shown in the flowchart. In such an embodiment, the computer program may be downloaded and installed from a network through the communication apparatus 709, or installed from the storage apparatus 706 or from the ROM 702. When executed by the processing apparatus 701, the computer program performs the above-mentioned functions defined in the method of the embodiments of the present disclosure.

The electronic device provided by the embodiments of the present disclosure belongs to a same disclosed concept as the information processing method provided by the above-mentioned embodiments, and technical details that are not described in detail in the present embodiment can be found in the above-mentioned embodiments, and the present embodiment provides same beneficial effects as the above-mentioned embodiments.

Tenth Embodiment

The embodiments of the present disclosure provide a computer storage medium on which a computer program is stored, and when executed by a processor, the program implements the information processing method provided by the above embodiments.

It should be noted that the above-mentioned computer readable medium in the present disclosure may be a computer readable signal medium or a computer readable storage medium or any combination thereof. The computer readable storage medium may be, for example, but not limited to, an electrical, magnetic, optical, electromagnetic, infrared, or semiconductor system, an apparatus or an equipment, or any combination thereof. More specific examples of the computer readable storage medium may include, but are not limited to, an electrical connection with one or more wires, a portable computer disk, a hard disk, a random access memory (RAM), a read-only memory (ROM), an erasable programmable read-only memories (EPROM) or a flash memories (FLASH), an optical fiber, a portable compact disk read-only memory (CD-ROM), an optical storage equipment, a magnetic storage equipment, or any suitable combination thereof. In the present disclosure, the computer readable storage medium may be any tangible medium that contains or stores a program, and the program may be used by or in combination with an instruction executing system, an apparatus or an equipment. In the present disclosure, the computer readable signal medium may include a data signal propagated in baseband or as a part of a carrier wave, in which computer readable program codes are carried. This kind of propagated data signal may be in a plurality of forms, including but not limited to an electromagnetic signal, an optical signal or any suitable combination thereof. The computer readable signal medium may also be any computer readable medium other than the computer readable storage medium, and the computer readable signal medium may send, propagate or transmit a program which is used by or in combination with an instruction executing system, an apparatus or an equipment. Program codes contained in the computer readable medium may be transmitted by any suitable medium, including but not limited to: an electric wire, an optical cable, RF (radio frequency), etc., or any suitable combination thereof.

In some embodiments, a client and a server may communicate using any currently known or future developed network protocol, such as HTTP (Hyper Text Transfer Protocol), and may be interconnected with any form or medium of digital data communication (e.g., a communication network). Examples of communication networks include a local area network ("LAN"), a wide area network ("WAN"), an Internet work (e.g., the Internet) and an end-to-end network (e.g., an ad hoc end-to-end network), as well as any currently known or future developed networks.

The computer readable medium may be included in the electronic device; or it may exist alone without being assembled into the electronic device.

The computer readable medium carries one or more programs, and when executed by the electronic device, the one or more programs cause the electronic device to:

receive a transcript and a sentence identifier of the transcript sent by a service server; and read a local sentence identifier, and when the received sentence identifier is the same as the local sentence identifier, update a displayed caption content corresponding to the local sentence identifier with the transcript.

Computer program codes for performing operations of the present disclosure may be written in one or more programming languages or a combination thereof, and the programming languages includes but are not limited to object-oriented programming languages such as Java, Smalltalk and C++, as well as conventional procedural programming languages such as "C" language or similar programming languages. The program codes may be completely executed on a user's computer, partially executed on the user's computer, executed as an independent software package, partially executed on the user's computer and partially executed on a remote computer, or completely executed on the remote computer or a server. In a case of the remote computer, the remote computer may be connected to the user's computer through any kind of networks, including a local area network (LAN) or a wide area network (WAN), or may be connected to an external computer (for example, being connected through the Internet with Internet service providers).

Eleventh Embodiment

The embodiments of the present disclosure further provide a computer program product, which includes a computer program carried on a computer readable medium, and when executed by a processor, the computer program implements the information processing method provided by the above embodiments.

Twelfth Embodiment

The embodiments of the present disclosure further provide a computer program, which, when running on an electronic device, implements the information processing method provided by the above embodiments.

Flowcharts and block diagrams in the drawings illustrate architectures, functions and operations of possible implementations of systems, methods and computer program products according to various embodiments of the present disclosure. In this regard, each block in the flowcharts or block diagrams may represent a module, a program segment, or a part of codes, and the module, the program segment or the part of codes contain one or more executable instructions for implementing specified logical functions. It should also be noted that in some alternative implementations, the functions labeled in the blocks may also occur in a different order than those labeled in the drawings. For example, two blocks shown in succession may actually be executed substantially in parallel, and sometimes they may be executed in a reverse order, which depends on functions involved. It should also be noted that each block in the block diagrams and/or flowcharts, and combinations of blocks in the block diagrams and/or flowcharts, may be realized by a dedicated hardware-based system which performs specified functions or operations, or may be realized by a combination of dedicated hardware and computer instructions.

Units involved in the embodiments described in the present disclosure may be realized by software or hardware. Where, in some cases, a name of a unit or a module does not constitute a limitation on the unit or the module per se, for example, a displaying module may also be described as "caption displaying module".

The functions described above herein may be at least partially executed by one or more hardware logic components. For example, without limitation, an exemplary type of hardware logic component that may be used include: a field programmable gate array (FPGA), an application specific integrated circuit (ASIC), application specific standard parts (ASSP), a system on chip (SOC), a complex programmable logic apparatus (CPLD), etc.

In the context of the present disclosure, a machine readable medium may be a tangible medium that can contain or store a program which may be used by an instruction executing system, an apparatus or an equipment, or be used in conjunction with an instruction executing system, an apparatus, or an equipment. The machine readable medium may be a machine readable signal medium or a machine readable storage medium. The machine readable medium may include, but is not limited to, an electronic, magnetic, optical, electromagnetic, infrared, or semiconductor system, an apparatus or an equipment, or any suitable combination thereof. More specific examples of the machine readable storage medium may include an electrical connection based on one or more wires, a portable computer disk, a hard disk, a random access memory (RAM), a read-only memory (ROM), an erasable programmable read-only memory (EPROM) or a flash memory, an optical fiber, a compact disk read-only memory (CD-ROM), an optical storage apparatus, a magnetic storage apparatus, or any suitable combination thereof.

According to one or more embodiments of the present disclosure, a [first example] provides an information processing method applied to a client, and the method includes:

receiving a transcript and a sentence identifier of the transcript sent by a service server; and reading a local sentence identifier, and when the received sentence identifier is the same as the local sentence identifier, updating a displayed caption content corresponding to the local sentence identifier with the transcript.

According to one or more embodiments of the present disclosure, a [second example] provides an information processing method, further including:

in an embodiment of the present disclosure, while receiving the transcript and the sentence identifier of the transcript sent by the service server, the method further includes:

receiving a content version serial number corresponding to the sentence identifier sent by the service server;

correspondingly, the reading the local sentence identifier, and when the received sentence identifier is the same as the local sentence identifier, updating the displayed caption content corresponding to the local sentence identifier with the transcript, includes:

reading the local sentence identifier and a local content version serial number corresponding to the local sentence identifier;

when the received sentence identifier is the same as the local sentence identifier, and the received content version serial number ranks behind the local content version serial number, updating a displayed caption content corresponding to the local sentence identifier and the content version serial number with the transcript; and updating the local content version serial number corresponding to the local sentence identifier with the received content version serial number.

According to one or more embodiments of the present disclosure, a [third example] provides an information processing method, further including:

when the received sentence identifier is different from the local sentence identifier, displaying the transcript as a new caption content, and updating the local sentence identifier with the received sentence identifier.

According to one or more embodiments of the present disclosure, a [fourth example] provides an information processing method, further including:

in an embodiment of the present disclosure, when there are at least two groups of received transcripts and sentence identifiers, the reading the local sentence identifier, and when the received sentence identifier is the same as the local sentence identifier, updating the displayed caption content corresponding to the local sentence identifier with the transcript, includes:

reading a local sentence identifier, and determining whether there is a same sentence identifier as the local sentence identifier in the at least two received sentence identifiers;

if so, updating a displayed caption content corresponding to the local sentence identifier with a transcript corresponding to the same sentence identifier; and displaying a transcript corresponding to a different sentence identifier as a new caption content.

if not, displaying the received at least two transcripts as at least two new caption contents respectively; and taking both the received at least two sentence identifiers as new local sentence identifiers.

According to one or more embodiments of the present disclosure, a [fifth example] provides an information processing method, further including:

in an embodiment of the present disclosure, the updating the displayed caption content corresponding to the local sentence identifier with the transcript, includes replacing the displayed caption content corresponding to the local sentence identifier with the transcript.

According to one or more embodiments of the present disclosure, a [sixth example] provides an information processing method, further including:

in an embodiment of the present disclosure, the client is a client of a real-time interactive application, and the real-time interactive application includes at least one of an instant messaging application, a multi-media conference application, a live video application and a group chat interactive application.

The above description is only preferred embodiments of the present disclosure and an explanation of applied technical principles. Persons skilled in the art should understand that disclosed scope involved in the present disclosure is not limited to technical solutions formed by specific combinations of the above technical features, but also covers other technical solutions formed by any combination of the above technical features or their equivalent features without departing from the above disclosed concept. For example, a technical solution formed by mutually replacing the above features with technical features with similar functions disclosed in the present disclosure (but not limited to).

In addition, although operations are depicted in a particular order, this should not be understood as requiring these operations to be performed in the particular order shown or in sequential order. Under certain circumstances, multitasking and parallel processing may be beneficial. Similarly, although the above discussion contains a number of specific implementation details, these should not be interpreted as limitations on the scope of the present disclosure. Some features described in the context of separate embodiments may also be implemented in a single embodiment in combination. On the contrary, various features described in the context of a single embodiment may also be implemented in a plurality of embodiments individually or in any suitable sub-combination.

Although the subject matter has been described in language specific to structural features and/or logical actions of methods, it should be understood that the subject matter defined in the appended claims is not necessarily limited to the specific features or actions described above. On the contrary, the specific features and actions described above are only exemplary forms of implementing the claims.

What is claimed is:

1. An information processing method, comprising:

receiving a first transcript corresponding to first audio data;

displaying the first transcript;

receiving a second transcript corresponding to second audio data, wherein the first audio data and the second audio data correspond to a same sentence or different sentences, and the first audio data is a subset of the second audio data when the first audio data and the second audio data correspond to the same sentence; and displaying the second transcript to update the first transcript;

wherein the displaying the second transcript to update the first transcript comprises:

displaying the second transcript to replace the first transcript; or, displaying a transcript updated based on a difference between the first transcript and the second transcript;

wherein the method further comprises:

receiving a first sentence identifier of the first transcript; and receiving a second sentence identifier of the second transcript;

correspondingly, the displaying the second transcript to update the first transcript comprises:

in response to the second sentence identifier being the same as the first sentence identifier, displaying the second transcript to update the first transcript;

wherein the method further comprises:

in response to the second sentence identifier being different from the first sentence identifier, displaying the first transcript and the second transcript;

wherein the method further comprises:

receiving a first content version serial number corresponding to the first sentence identifier;

receiving a second content version serial number corresponding to the second sentence identifier; and correspondingly, in response to the second sentence identifier being the same as the first sentence identifier, displaying the second transcript to update the first transcript comprises:

in response to the second sentence identifier being the same as the first sentence identifier, and the second content version serial number ranks behind the first content version serial number, displaying the second transcript to update the first transcript.

2. The method according to claim 1, wherein the displaying the first transcript comprises: displaying the first transcript in a first display control, wherein the first display control is configured to display a transcript; and the displaying the second transcript to update the first transcript comprises: displaying the second transcript in the first display control to replace the first transcript; or, displaying a transcript updated in the first display control based on a difference between the first transcript and the second transcript.

3. The method according to claim 1, further comprising:

in response to the second sentence identifier being different from the first sentence identifier, displaying the second transcript in a second display control, wherein the second display control is configured to display a transcript.

4. The method according to claim 1, further comprising:

receiving an identity identifier of audio data from which a transcript is transcribed; and displaying the identity identifier with the transcript.

5. The method according to claim 1, wherein the first transcript is translated from a first language, and the second transcript is translated from a second language.

6. The method according to claim 5, wherein the first transcript and the second transcript are translated according to language information from a client.

7. The method according to claim 1, wherein before the receiving the first transcript, the method further comprises: receiving a caption enabling request.

8. The method according to claim 7, wherein the caption enabling request comprises an identity identifier representing the client or a location of the client.

9. The method according to claim 7, wherein the caption enabling request comprises language information of the transcript.

10. An electronic device, comprising:

one or more processors; and a storing apparatus, configured to store one or more programs, when the one or more programs are executed by the one or more processors, the electronic device is enabled to:

receive a first transcript corresponding to first audio data;

display the first transcript;

receive a second transcript corresponding to second audio data, wherein the first audio data and the second audio data correspond to a same sentence or different sentences, and the first audio data is a subset of the second audio data when the first audio data and the second audio data correspond to the same sentence; and display the second transcript to update the first transcript;

wherein the electronic device is further enabled to:

display the second transcript to replace the first transcript; or, display a transcript updated based on a difference between the first transcript and the second transcript;

wherein the electronic device is further enabled to:

receive a first sentence identifier of the first transcript;

receive a second sentence identifier of the second transcript; and correspondingly, the electronic device is further enabled to:

in response to the second sentence identifier being the same as the first sentence identifier, display the second transcript to update the first transcript;

wherein the electronic device is further enabled to:

in response to the second sentence identifier being different from the first sentence identifier, display the first transcript and the second transcript;

wherein the electronic device is further enabled to:

receive a first content version serial number corresponding to the first sentence identifier;

receive a second content version serial number corresponding to the second sentence identifier; and correspondingly, the electronic device is further enabled to:

in response to the second sentence identifier being the same as the first sentence identifier, and the second content version serial number ranks behind the first content version serial number, display the second transcript to update the first transcript.

11. The electronic device according to claim 10, wherein the electronic device is further enabled to:

in response to the second sentence identifier being different from the first sentence identifier, display the second transcript in a second display control, wherein the second display control is configured to display a transcript.

12. The electronic device according to claim 10, wherein the electronic device is further enabled to:

receive an identity identifier of audio data from which a transcript is transcribed; and display the identity identifier with the transcript.

13. The electronic device according to claim 10, wherein the first transcript is translated from a first language, and the second transcript is translated from a second language.

14. The electronic device according to claim 13, wherein the first transcript and the second transcript are translated according to language information from a client.

15. The electronic device according to claim 10, wherein before the receiving the first transcript, the electronic device is further enabled to: receive a caption enabling request.

16. The electronic device according to claim 15, wherein the caption enabling request comprises an identity identifier representing the client or a location of the client.

17. The electronic device according to claim 15, wherein the caption enabling request comprises language information of the transcript.

18. A non-transitory storage medium containing a computer executable instruction, wherein, when executed by a computer processor, the computer executable instruction is used to execute the the following steps:

receiving a first transcript corresponding to first audio data;

displaying the first transcript;

receiving a second transcript corresponding to second audio data, wherein the first audio data and the second audio data correspond to a same sentence or different sentences, and the first audio data is a subset of the second audio data when the first audio data and the second audio data correspond to the same sentence; and displaying the second transcript to update the first transcript;

wherein the displaying the second transcript to update the first transcript comprises:

displaying the second transcript to replace the first transcript; or, displaying a transcript updated based on a difference between the first transcript and the second transcript;

wherein the computer executable instruction is further used to execute the following steps:

receiving a first sentence identifier of the first transcript; and receiving a second sentence identifier of the second transcript;

correspondingly, the displaying the second transcript to update the first transcript comprises:

in response to the second sentence identifier being the same as the first sentence identifier, displaying the second transcript to update the first transcript;

wherein the computer executable instruction is further used to execute the following steps:

in response to the second sentence identifier being different from the first sentence identifier, displaying the first transcript and the second transcript;

wherein the computer executable instruction is further used to execute the following steps:

receiving a first content version serial number corresponding to the first sentence identifier;

receiving a second content version serial number corresponding to the second sentence identifier; and correspondingly, in response to the second sentence identifier being the same as the first sentence identifier, displaying the second transcript to update the first transcript comprises:

in response to the second sentence identifier being the same as the first sentence identifier, and the second content version serial number ranks behind the first content version serial number, displaying the second transcript to update the first transcript.

19. The non-transitory storage medium according to claim 18, wherein the computer executable instruction is further used to execute the following steps:

in response to the second sentence identifier being different from the first sentence identifier, displaying the second transcript in a second display control, wherein the second display control is configured to display a transcript.

20. The non-transitory storage medium according to claim 18, wherein the computer executable instruction is further used to execute the following steps:

receiving an identity identifier of audio data from which a transcript is transcribed; and displaying the identity identifier with the transcript.

* * * * *